United States Patent [19]
Kawai et al.

[11] Patent Number: 5,642,124
[45] Date of Patent: Jun. 24, 1997

[54] IMAGE PROCESSING SYSTEM

[75] Inventors: Tomoaki Kawai, Yokohama; Hiroaki Satoh, Sagamihara; Hideyuki Tamura, Yamato, all of Japan

[73] Assignee: Canon Kabushiki Kaisha, Tokyo, Japan

[21] Appl. No.: 312,933

[22] Filed: Sep. 30, 1994

Related U.S. Application Data

[63] Continuation of Ser. No. 972,087, Nov. 5, 1992, abandoned, which is a continuation of Ser. No. 492,576, Mar. 13, 1990, abandoned.

[30] Foreign Application Priority Data

May 16, 1989 [JP] Japan ................................ 1-123868

[51] Int. Cl.$^6$ .................................................... G09G 5/00
[52] U.S. Cl. ........................... 345/2; 345/119; 395/340
[58] Field of Search .................... 345/1, 2, 3, 115, 345/118, 119, 120, 145, 146, 203, 902; 395/339, 340, 342, 346

[56] References Cited

U.S. PATENT DOCUMENTS

| | | | |
|---|---|---|---|
| 4,642,790 | 2/1987 | Minshull et al. | 340/723 |
| 4,684,935 | 8/1987 | Fujisaku et al. | 345/1 |
| 4,700,320 | 10/1987 | Kapur | 340/723 |
| 4,802,104 | 1/1989 | Ogiso | 340/723 |
| 4,819,189 | 4/1989 | Kikuchi et al. | 340/723 |
| 4,845,644 | 7/1989 | Anthias et al. | 340/729 |
| 4,890,098 | 12/1989 | Dawes et al. | 340/723 |
| 4,890,257 | 12/1989 | Anthias et al. | 340/721 |
| 4,891,633 | 1/1990 | Imazeki et al. | 340/717 |
| 4,897,636 | 1/1990 | Nishi et al. | 340/723 |
| 4,954,818 | 9/1990 | Nakane et al. | 340/799 |
| 4,974,173 | 11/1990 | Stefik et al. | 345/2 |
| 5,008,853 | 4/1991 | Bly et al. | 345/2 |
| 5,046,001 | 9/1991 | Barker et al. | 340/721 |
| 5,047,754 | 9/1991 | Akatsuka et al. | 345/1 |
| 5,117,225 | 5/1992 | Wang | 315/2 |
| 5,285,192 | 2/1994 | Johury et al. | 345/3 |

OTHER PUBLICATIONS

"Software Environment (5) for Image Processing Workstation—Window System Suitable for Use in Image Processing", The 38th National Convention: Treatises for Lectures (II): Data Processing/Software/Software Engineering of the Information Processing Society of Japan, Mar. 15, 1989.

*Primary Examiner*—Steven Saras
*Attorney, Agent, or Firm*—Fitzpatrick, Cella, Harper & Scinto

[57] ABSTRACT

An image processing system in which a process for implementing part of the display management function is provided separately from the window system or the operating system. In consequence, changes in the system configuration can be coped with only by conducting addition on a user program or the process which implements part of the display management function without modifying or altering the window system or the operating system. This eliminates modification or alteration of the window system or the operating program and increases the portability of the program.

16 Claims, 7 Drawing Sheets

| FRAME NO. | FRAME WINDOW IDENTIFIER | IMAGE WINDOW IDENTIFIER | ICON WINDOW IDENTIFIER |
|---|---|---|---|
| 0 | -1 | -1 | 2001 |
| 1 | 1001 | -1 | -1 |
| 2 | 1002 | 2002 | 2003 |
| 3 | 1003 | -1 | -1 |
| 4 | 1004 | 2004 | 2005 |

FIG. 6

IMAGE PROCESSING SYSTEM

This application is a continuation of application Ser. No. 07/972,087 filed Nov. 5, 1992, abandoned which is a continuation of application Ser. No. 07/492,576, filed Mar. 13, 1990, both now abandoned.

BACKGROUND OF THE INVENTION

1. Field of the Invention

The present invention relates to an image processing system, and more particularly, to a window system suitable for processing images which are displayed on a plurality of display devices.

2. Related Background Art

In a conventional image processing system, an image-only display is connected to an engineering work station (abbreviated to EWS), and images are displayed on the image-only display. In that case, a bit-map display may also be used to display images. Generally, in the case of display of images on a display, such as an on the image-only display, an image-only display display processing routine is called to perform display. Thus, when images are to be output to the EWS, a display processing routine offered by the EWS is called. In the case of the EWS, a multi-window system may be activated, and images may also be displayed in the windows. The multi-window system may be incorporated in the operating system (abbreviated to OS) of the EWS or be provided separately from the operating system as an individual process.

On such a system, display management may be performed, e.g., the display destination may be changed over from, for example, the image-only display to the window. Alternatively, the image may be temporarily saved on the display of the EWS in the form of an icon (a symbol). The associated functions may be incorporated in the process which implements the window system or in the operating system.

However, in that system, when changes occur in the system configuration, including the image processing hardware, the number of planes on the bit-map display of the EWS, and the number of displays connected to the system, the program which performs display and management of images, such as the process which implements the window system or the operating system, must be modified or altered. However, modification or alteration of the program itself is a troublesome task, and increases production cost. At the same, the portability and modularity of the program are degraded.

SUMMARY OF THE INVENTION

An object of the present invention is to provide an image processing system in which window display is performed and in which display management of an image-only display and a window display can be achieved without modification or alteration of a window system or an operating system.

Another object of the present invention is to provide an image processing system in which a process for implementing part of the display managing function is provided separately from the window system or the operating system so that changes in the system configuration can be coped with only by conducting addition on a user program or the process which implements part of the display managing function without modifying or altering the window system or the operating system, and which thereby eliminates modification or alteration of the window system or the operating program and increases the portability of the program.

Other objects and advantages of the invention will become apparent from the following description taken in connection with the accompanying drawings.

DETAILED DESCRIPTION OF THE EMBODIMENTS

Figure 1:
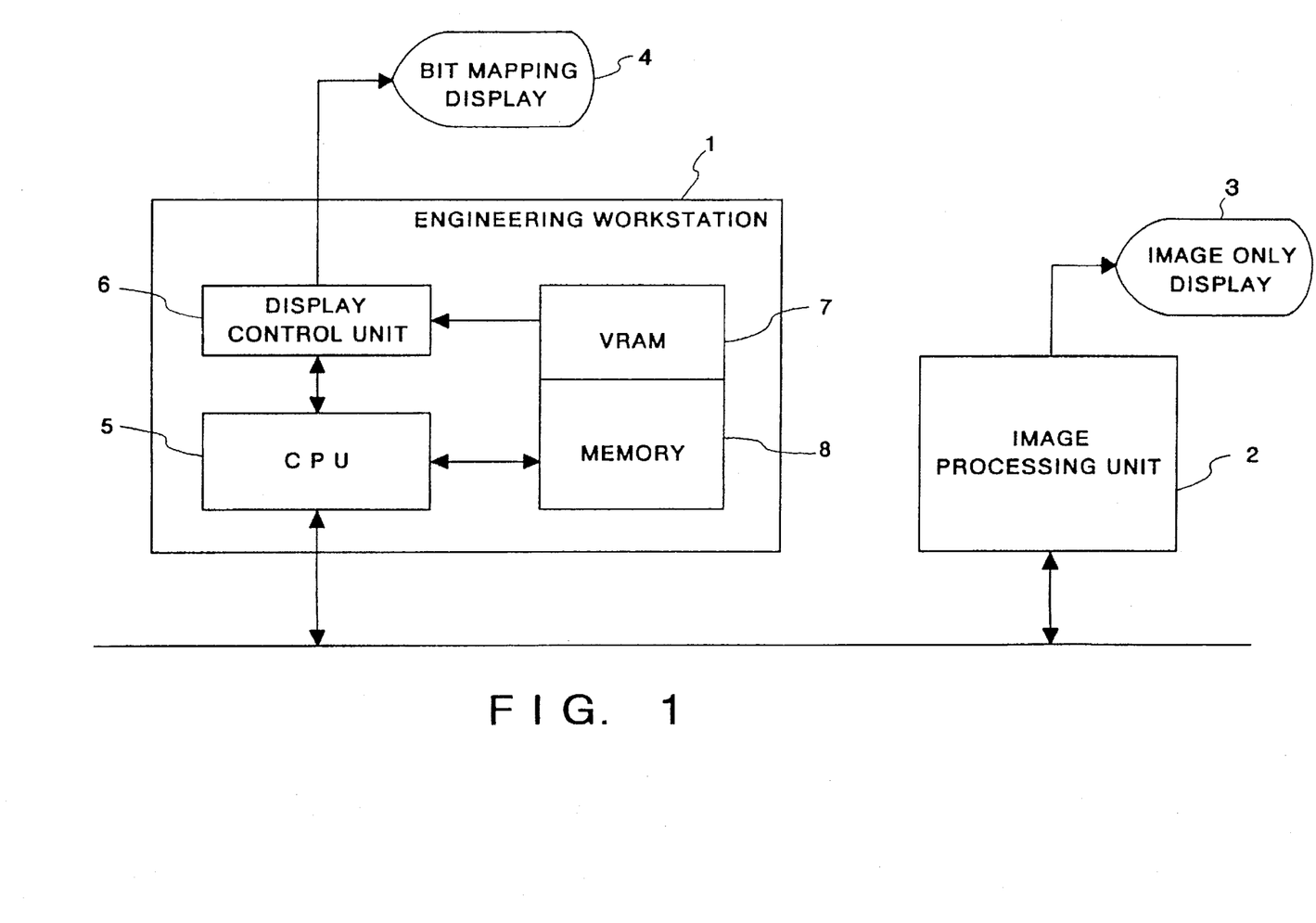
FIG. 1 is a block diagram of an embodiment of an image processing system according to the present invention.

FIG. 1 is a block diagram of an embodiment of the present invention. An image processing system includes an EWS 1, an image processing unit 2, a bit map, display 4 for the EWS, an image-only display 3 for the EWS 1, and a display control unit 6 for displaying data in a VRAM 7 on the bit map display.

Figure 2:
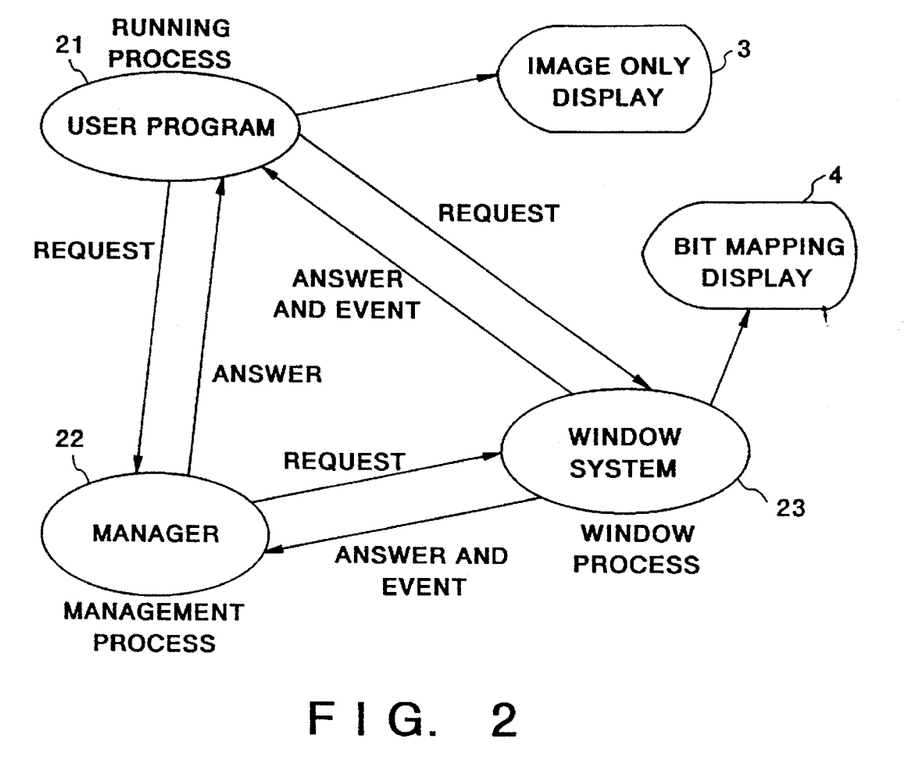
FIG. 2 shows the configuration of the processes in the system of FIG. 1.

FIG. 2 shows the process configuration of the system of FIG. 1. The system contains a process 21 which executes a program which performs image display, a process 22 which executes display management, and a window process 23 which implements multi-windows on the bit map display. All the processes 21, 22 and 23 are executed by a CPU 5. The display management process 22 offers the function of displaying a plurality of frames (empty windows) such as those shown in FIG. 3 utilizing the function of the window process 23 and treating respective frame windows 31, 32, 33 and 34 as virtual display devices. The frames 31, 32, 33 and 34 are always on the screen of the display while the display management process 22 is in operation. The number of frames is not limited to 4 but an arbitrary number of frames may be generated.

Figure 3:
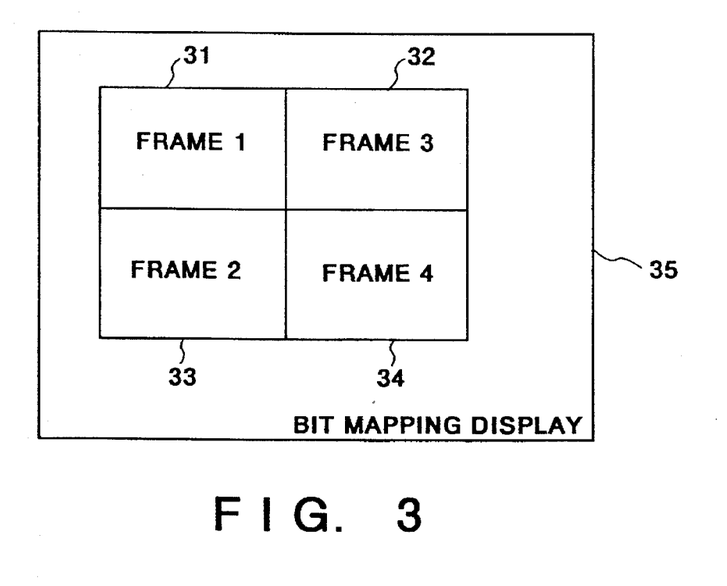
FIG. 3 shows one screen on a bit map display of an engineering work station.

Next, the operation of the system shown in FIG. 2 will be described in brief. The executing process 21, which performs display of images on the image-only display 3 or either of the frame windows 31, 32, 33 and 34 on the bit map display 4, sends the display management request to the management process 22 through interprocess communications prior to the display. Upon receipt of the display management request, the display management process 22 registers in a management table (which will be described later with reference to FIG. 6) stored in the display management process 22 the display destination, the display or frame window, the image to be displayed and other information, and then returns to the executing process 21 the type of display destination, i.e., the type of image-only display 3 or the frame window number. The executing process 21 changes over the display method (display routine) in accordance with the type of display destination and performs display. If the display destination is either of the frame windows, 31, 32, 33 and 34, the executing process 21 sends display request to the window process 23, and thereby performs display. If the display destination is the image-only display 3, the executing process 21 performs display by using the display command of the image processing hardware. After the display, in a case where an operation is to be performed, such as saving of images in the form of an icon or movement of the display destinations including the frame windows, an instruction of the operation is issued to the management process 22 so as to activate the operation. The instruction may be generated by the operation menu possessed by the management process 22 itself or by the request from the executing process 21 or other executing processes. Once the operation is activated so as to, for example, move the image displayed in the frame window 31 onto the image-only display 3, the management process 22 works on both the window process 23 and the executing process 21 utilizing the interprocess communications and the communication function (event functions) possessed by the window process to achieve the operation.

Next, the operation of the system shown in FIG. 2 will be described in detail with reference to the flowchart of FIG. 4. It is to be noted that the present embodiment employs the X-Window System developed by Massachusetts Institute of Technology. In this window system, the associated executing process displays images in the windows by the following procedures: (1) Creation of windows. (2) Display of the created windows (windows are empty) (3) Receipt of the display request by the window process and generation of plotting event (4) Receipt of the plotting event and plotting of pictures or images in the created windows.

Figure 4A:
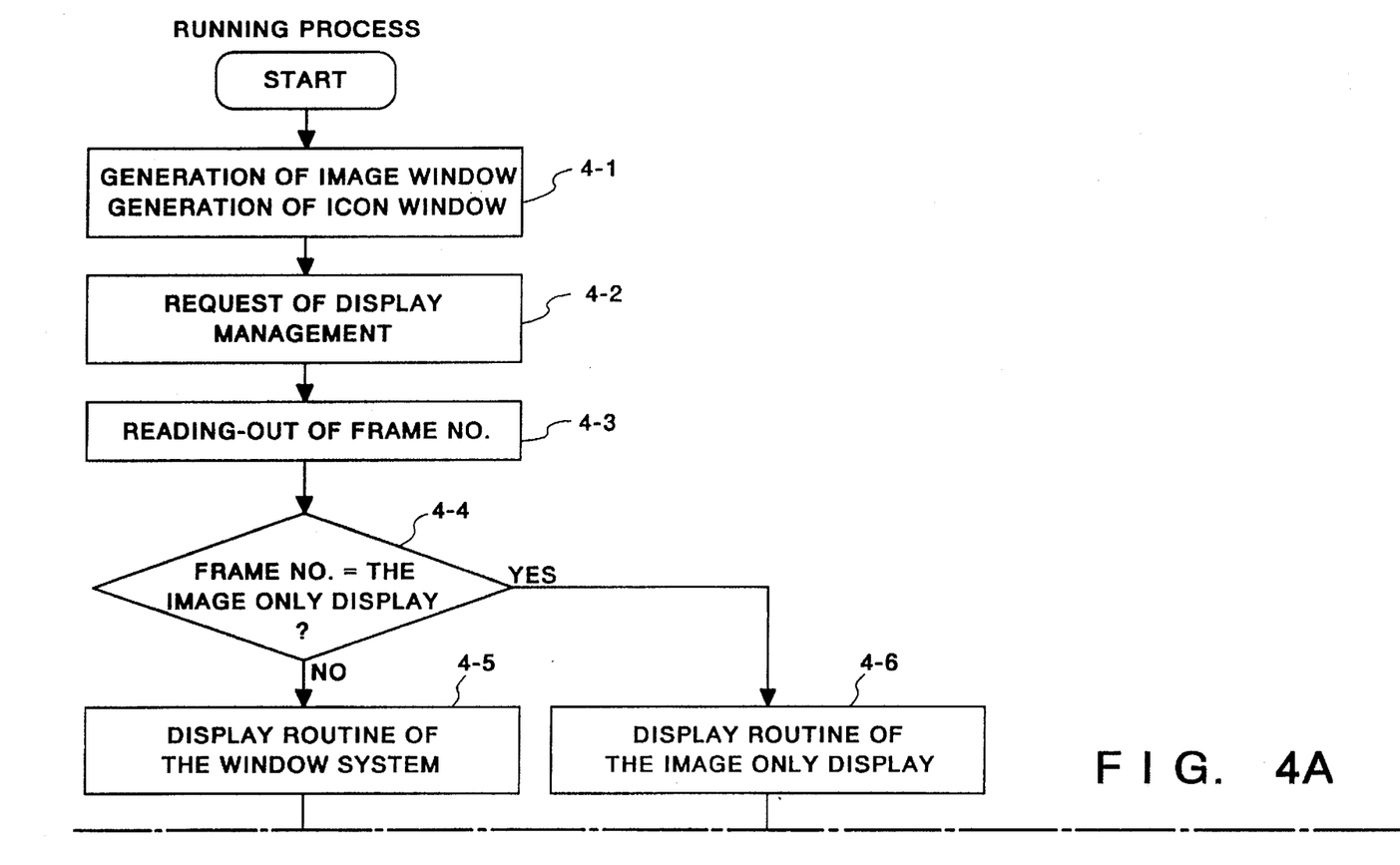
FIG. 4 is a flowchart of an executing processor; and user process.
Figure 4B:
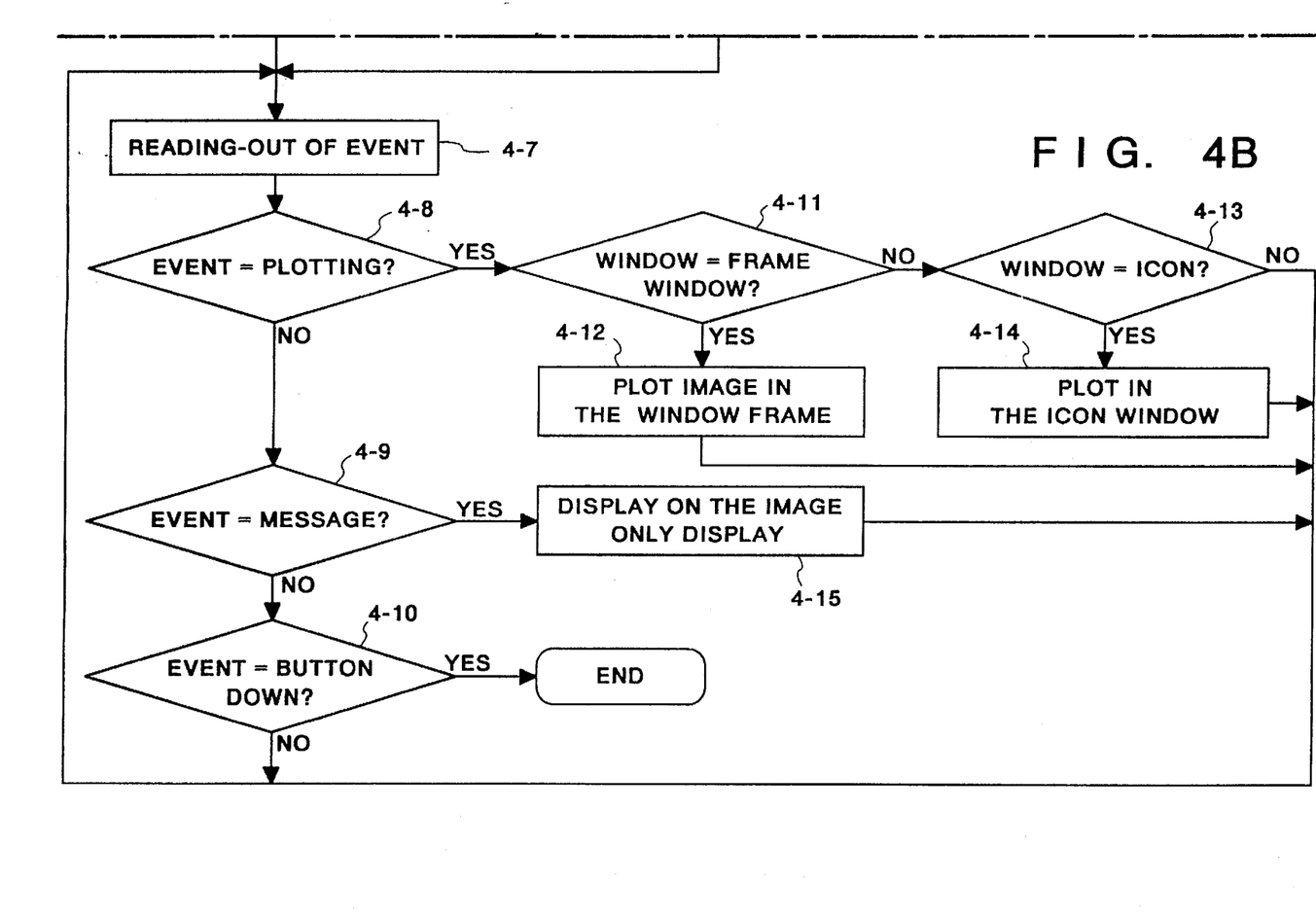
Figure 5A:
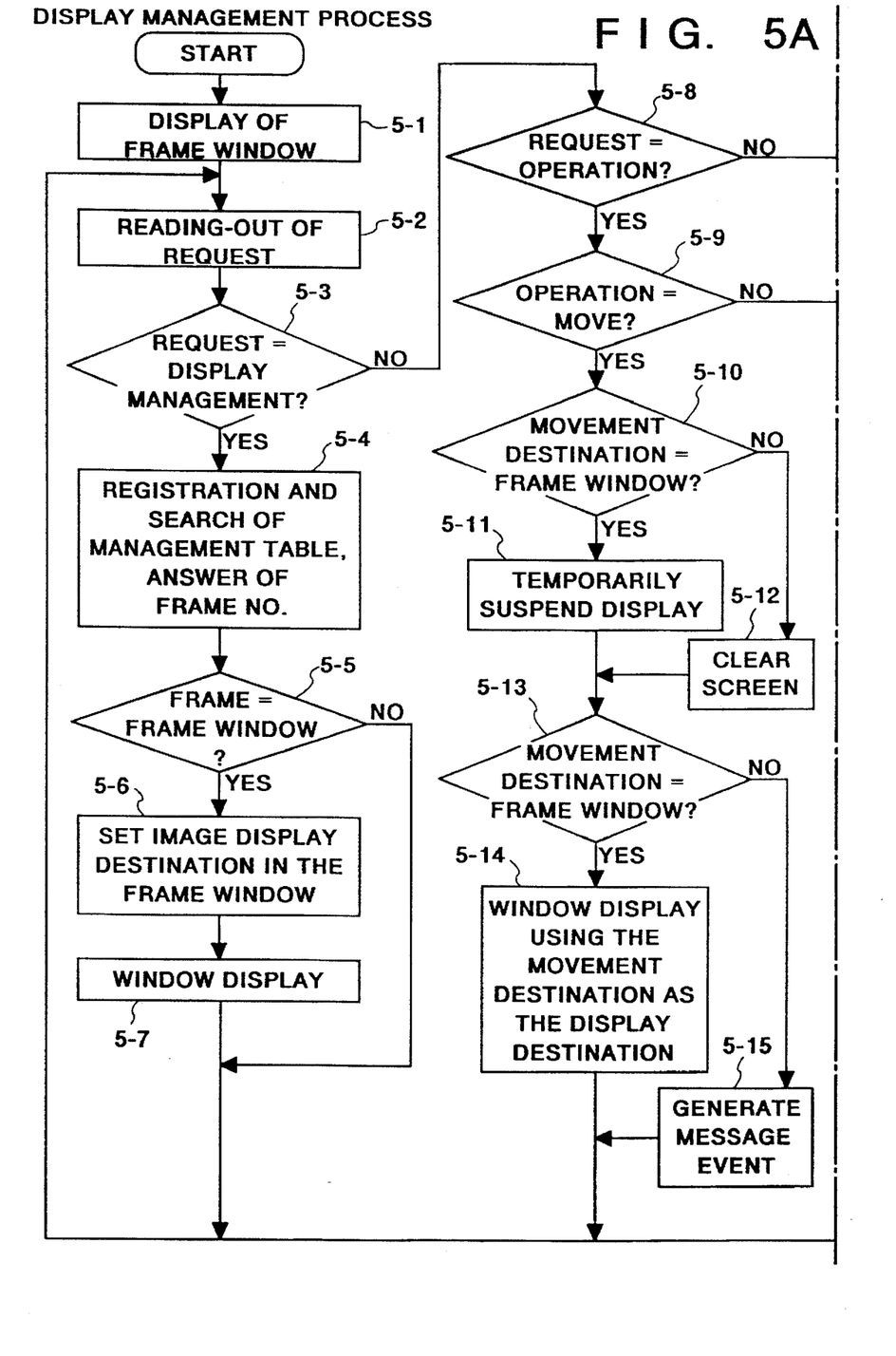
FIG. 5 is a flowchart of a display management process.
Figure 5B:
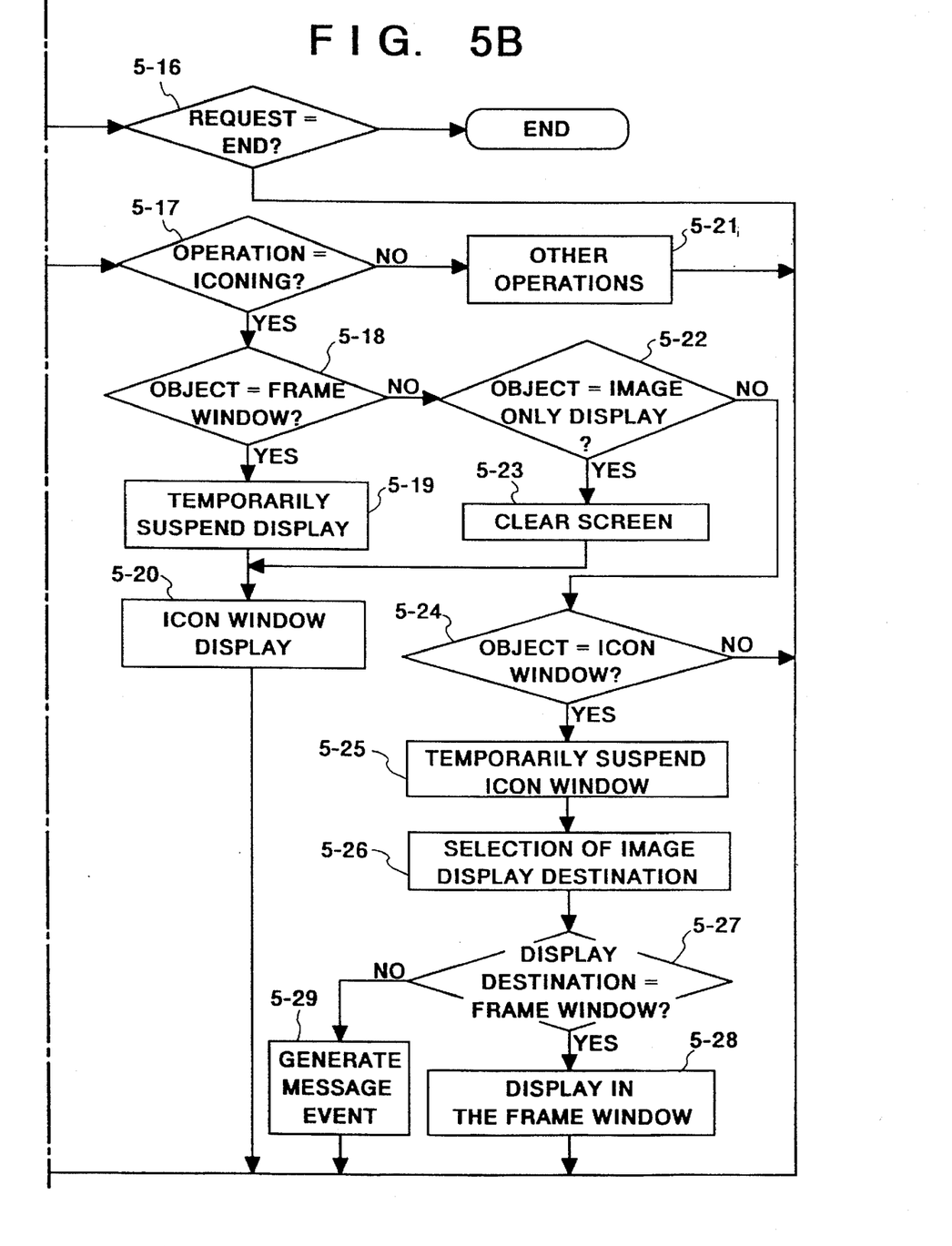

FIG. 4 is a flowchart of the process which executes the image display program, and FIG. 5 is a flowchart of the process which executes management. The management process 22 displays the frame windows such as those shown in FIG. 3 in step 5-1 in FIG. 5, and waits for a request from the display executing process 21 in step 5-2. By this time, the executing process 21 has generated the frame windows of an image and the window for icons in order to display the image on the window system in step 4-1 in FIG. 4. The executing process 21 then sends the display management request to the management process 22 in order to put the image under control of the management process 22 (step 4-2). Upon receipt of the request, the management process 22 registers in the management table (FIG. 6) an image window identifier and an icon window identifier which are obtained when the frame windows and the icon window have been generated by the executing process in step 4-1, examines whether the display management request is requesting the frame windows or the image-only display, and returns to the executing process 21 the number, called frame No., which identifies either of the frame windows 31, 32, 33 and 34 and the image-only display 3. The frame windows 31, 32, 33 and 34 are respectively represented by frame Nos. 1, 2, 3 and 4, and the image-only display has frame No. 0. The executing process 21 checks the display destination from the frame No., i.e., whether the display destination is the frame window or the image-only display 3, and calls the display routine of the window system or of the image hardware which corresponds to the frame No. (steps 4-5 and 4-6). If the destination is the image-only display 3, the image is displayed immediately at this point. However, in the case of the frame window, the executing process 21 receives a plotting event and then performs image display using the image window identifier (steps 4-8, 4-11 and 4-12). These are the procedures of displaying an image.

Next, a method of performing an operation including movement on the image displayed in either of the frame windows 31, 32, 33 and 34 or on the image-only display 3 will be further described with reference to the flowcharts in FIGS. 4 and 5.

In this example, the request transmitted through the interprocess communications is executed. However, the request of an operation may be input from the menu of the management process or the like.

First, movement operation will be described. Assuming that the image displayed in the frame window 31 is moved onto the image-only display 3, since the type of request is "operation" and, at the same time, "movement", the request is received in step 5-2, and then the process proceeds to step 5-10. Because the original display is the frame window, the management process 22 temporarily suspends display of the image using the image window identifier (step 5-11). Next, since the destination display is not the frame window but the image-only display 3, the management process 22 sends the request indicating display of image onto the image-only display 3 to the executing process 21 using "message" as the event (in step 5-15). The executing process 21 receives the "message" event, and actually displays the image on the image-only display 3 by calling the display routine of the image hardware (in step 4-15).

Conversely, in a case where the destination display is switched over from the image-only display 3 to the frame window 31, the image on the image display is cleared using the clear routine of the image hardware in step 5-12 in FIG. 5, and the image is then displayed on the frame window 31 using the image window identifier in step 5-14. The window process 23 receives the image display request generated in step 5-14 and generates "plotting" event. The executing process 21 receives this "plotting" event and then actually displays the image in the frame window in step 4-12.

The other operations such as saving of an image in the form of an icon are executed by the similar procedures (from steps 5-17 to 5-29).

Since the type of request is "operation" and "forming icon" in step 5-2, the process proceeds to step 5-17 and step 5-18.

In steps 5-18 and 5-22, it is determined whether the object display to be formed into an icon window is one of the frame windows 31–34 or the image-only display 3.

When the object display is one of the frame windows 31–34, the process proceeds to step 5-19 and the management process 22 temporarily suspends display of the image using the image window identifier. Next, the image formed into an icon window is displayed on the screen of the bit map display 4 in step 5-20.

When the object display is the image-only display 3, the process proceeds to step 5-23 and the image on the image-only display 3 is cleared using the clear routine of the image hardware. Next, the icon-window formed is displayed on the screen of the bit map display 4 in step 5-20. 20.

When the object displayed is neither the image window nor the image-only display, but rather the icon-window formed beforehand, the process proceeds from step 5-24 to step 5-25, and the management process 22 temporarily suspends display of the icon-window.

Next, the destination display in which the icon-window designated as the object display is opened, and is selected in step 5-26.

When the destination display is one of the frame windows 31–34, the process proceeds from step 5-27 to step 5-28 and the image corresponding to the designated icon-window is displayed in one of the frame windows using the image window identifier. When the destination display is the image-only display 3, the process proceeds from step 5-27 to step 5-29, and the management process 22 sends the request indicating display of the image onto the image-only display 3 to the executing process 21 using "message" as the event.

The executing process 21 receives the "message" event, and actually displays the image on the image-only display 3 by calling the display routine of the image hardware (in step 4-15).

Figure 6:
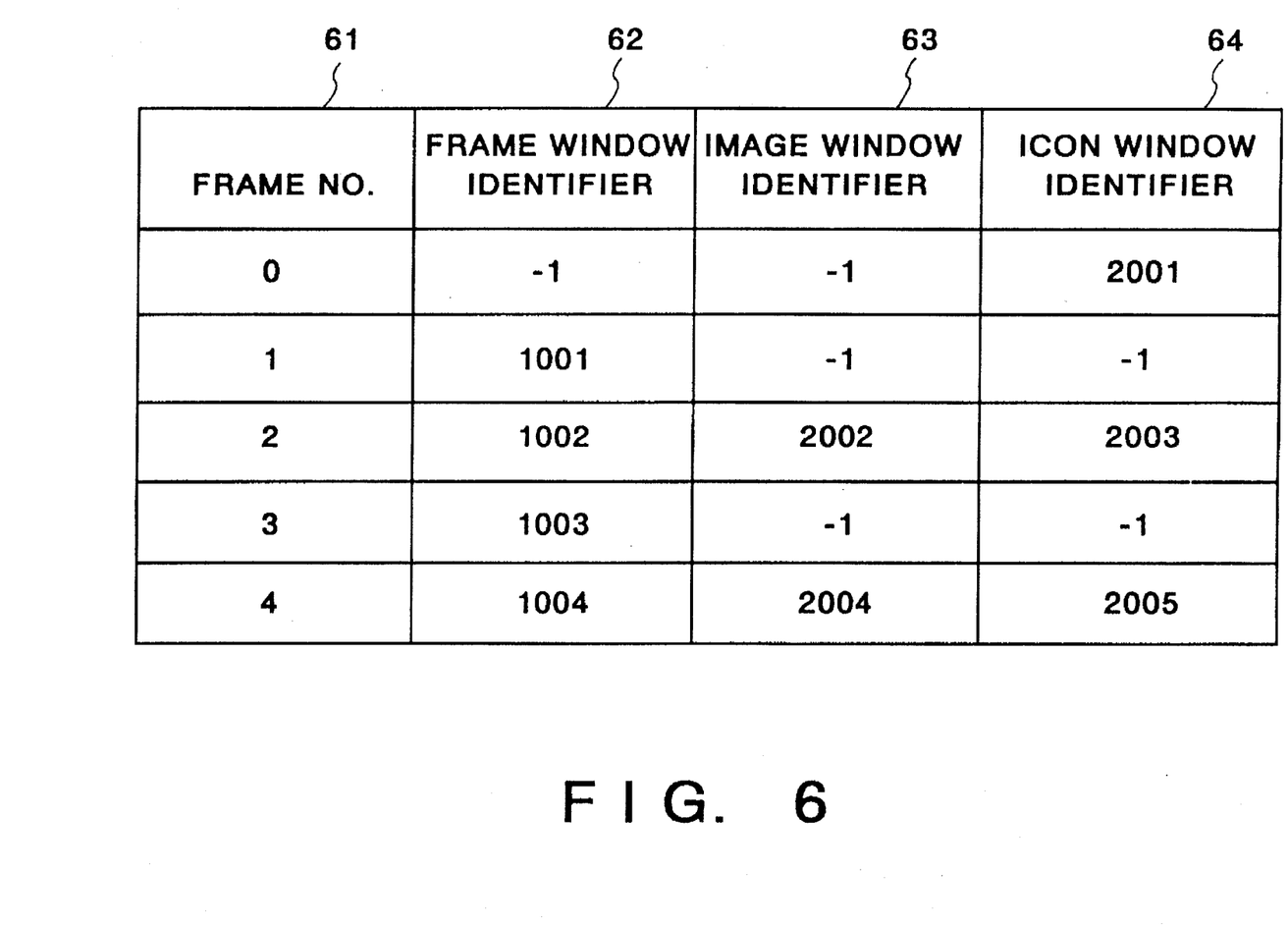
FIG. 6 shows a display management table.

In the management table shown in FIG. 6, a reference numeral 61 denotes frame No. by which various display devices are designated, and a reference numeral 62 denotes a window identifier designating the frame window 31, 32, 33 or 34. The window identifier 62 is used by the window process 23. −1 is given as the window identifier 62 for the image-only display 3 because no window identifier corresponds to the image-only display 3. A reference numeral 63 denotes an image window identifier. A value is set in this entry when an image is in its frame window. −1 indicates the state where no value is set. A reference numeral 64 denotes an icon window identifier by which the icon window to be displayed is registered when the image is saved in the form of an icon.

In this embodiment, the display management process is introduced in addition to the window process. Consequently, various operations, including movement of an image and saving of an image in the form of an icon, can be performed on the image-only display 3 and the frame windows which are the virtual display devices offered by the display management process without executing the window process.

The above-described embodiment employs one image-only display. However, the present invention is also applicable to an image processing system which incorporates two or more image-only displays. Furthermore, the above-described embodiment employs the window process in order to implement the multi-window. However, the present invention is also applicable to a system in which the operating system thereof incorporates the multi-window function. In that case, display management of the image-only display 3 and the frame windows can be performed without executing the operating system in the same manner by providing the management process with the exception that the instruction to the window process is replaced by the instruction to the operating system.

As will be understood from the foregoing description, in the present invention, a means for performing display management is provided as an individual process. Consequently, when there occur changes in the system configuration such as the change in the image-only display, display management of the image-only display and the window can be performed without modifying or altering the window process or the operating system. This reduces the production cost and eliminates a troublesome task of modifying or altering the program and improves the modularity of the program.

Various changes and modifications may be made in the invention without departing from the spirit and scope of the appended claims.

What is claimed is:

1. An image processing system comprising:

storage means for storing image information;

first display means having a first display type for displaying at least one window;

window executing means for forming and displaying the at least one window on said first display means;

second display means having a second display type different from the first display type and a display screen used to display an image represented by the image information;

display control means for controlling a display of the image represented by the image information on the display screen of said second display means; and display managing means for managing the image represented by the image information stored in said storage means to be displayed either in the at least one window of said first display means or on the display screen of said second display means, wherein said display managing means includes a display-management information table including display type data which indicates the at least one window and the display screen, and image information data which indicates the image information, in relation to each other, said display type data being changeable, and instructs said window executing means to display the image represented by the image information in the at least one window when the display type data is changed to indicate the at least one window, and said display control means to display the image represented by the image information on the display screen of said second display means when the display type data is changed to indicate the display screen.

2. An image processing system according to claim 1, further comprising a management data storage means for storing management data used to manage the window or the display screen on which the image information is to be displayed, the window or the display screen onto which the image information is to be moved, and the symbolized window in which the image information is to be displayed.

3. An image processing system according to claim 1, wherein said first display means is a bit map display.

4. A method of displaying an image represented by an image information in an image processing system having at least two display means comprising the steps of:

forming and displaying on a first display means plural windows in which an image represented by an image information is to be displayed;

displaying the image represented by the image information in at least one of the plural windows of said first display means or on a display screen of a second display means; and moving a display position of the image represented by the image information from a source display to a destination display in accordance with an instruction, input from any one of the source display and the destination display, wherein, when the source display is one of the plural windows of said first display means, the destination display is the display screen of said first display means and, when the source display is the display screen of said second display means, the destination display is one on the plural windows of said first display means.

5. A method according to claim 4, wherein the step of moving a display position includes;

forming an icon corresponding to each of the plural windows of the first display means and the display screen of the second display means;

opening any one of plural icons in a display position selected from the plural windows of the first display means and the display screen of the second display means in accordance with a display position instruction.

6. An image processing system comprising:

storage means for storing image information;

first display means for displaying at least one window;

window executing means for forming and displaying the at least one window on said first display means;

second display means having a display screen used to display an image represented by the image information stored in said storage means;

display control means for controlling a display of the image represented by the image information on the display screen of said second display means;

icon forming means for forming an icon corresponding to each of the at least one window on said first display means and the display screen on said second display means;

icon opening means for opening any one of the icons formed by said icon forming means; and display managing means for managing the image represented by the image information corresponding to the opened icon, to be displayed either in the at least one window of said first display means or on the display screen of said second display means, in accordance with an instruction in which a display position of the image represented by the image information corresponding to the opened icon is selected from the at least one window of said first display means and the display screen of said second display means.

7. An image processing system according to claim 6, further comprising a management data storage means for storing management data used to manage the at least one window of said first display means or the display screen of said second display means on which the image information is to be displayed, the at least one window or the display screen onto which the image information is to be moved, and the symbolized window in which the image information is to be displayed.

8. An image processing system according to claim 6, wherein said first display means is a bit map display.

9. A method of displaying an image represented by an image information in an image processing system having at least two display means comprising the steps of:

forming and displaying at least one window on first display means having a first display type by using window executing means;

forming a display-management information table including display type data which indicates the at least one window and a display screen of second display means having a second display type different from the first display type, and image information data which indicates an image information, in relation to each other, said display type data being changeable; and managing an image represented by the image information to be displayed either in the at least one window of said first display means or on the display screen of said second display means, by instructing said window executing means to display the image represented by the image information in the at least one window when the display type data in said display-management information table is changed to indicate the at least one window, and display control means to display the image represented by the image information on the display screen of said second display means when the display type data in said display-management information table is changed to indicate the display screen.

10. A method according to claim 9, further comprising a step of preparing management data used to manage the window or the display screen on which the image information is to be displayed, the window or the display screen onto which the image information is to be moved, and a symbolized window in which the image information is to be displayed.

11. An image processing system comprising:

first and second display means;

window executing means for forming and displaying on said first display means plural windows in which an image represented by an image information is to be displayed;

display means for displaying the image represented by the image information in at least one of the plural windows of said first display means or on a display screen of said second display means; and moving means for moving a display position of the image represented by the image information from a source display to a destination display in accordance with an instruction, input from any one of the source display and the destination display, wherein, when the source display is one of the plural windows of said first display means, the destination display is the display screen of said second display means and, when the source display is the display screen of said second display means, the destination display is one on the plural windows of said first display means.

12. An image processing system according to claim 11, wherein said moving means comprises:

icon forming means for forming an icon corresponding to each of the plural windows of said first display means and the display screen of said second display means; and icon opening means for opening any one of plural icons in a display position selected from the plural windows of said first display means and the display screen of said second display means in accordance with a display position instruction.

13. An image processing system according to claim 11, wherein said first display means is a bit map display.

14. A method of displaying an image represented by an image information in an image processing system having at least two display means comprising the steps of:

forming and displaying at least one window on first display means having a first display type;

displaying the image represented by the image information on the at least one window or a display screen of second display means having a second display type different from the first display type;

forming an icon corresponding to each of the at least one window on said first display means and the display screen on said second display means;

opening any one of icons formed by said icon forming means; and managing the image represented by the image information corresponding to the opened icon, to be displayed either in the at least one window of said first display means or on the display screen of said second display means, in accordance with an instruction in which a display position of the image represented by the image information corresponding to the opened icon is selected from the at least one window of said first display means and the display screen of said second display means.

15. A method according to claim 14, further comprising a step of preparing management data used to manage the at least one window of the first display means or the display screen of the second display means on which the image information is to be displayed, the at least one window or the display screen onto which the image information is to be moved, and a symbolized window in which the image information is to be displayed.

16. A method of displaying an image represented by an image information in an image processing system having at least two display means, a first display means having a first display type and a second display means having a second display type different from the first display type, comprising the steps of:

forming and displaying at least one window on the first display means by a window executing means;

instructing a display control means for controlling a display on a screen of the second display means to display the image represented by the image information, when a display on the screen of the second display means is indicated; and instructing the window executing means to display the image represented by the image information on a desired window, the window executing means selecting the desired window and providing the image information to the display control means, and the display control means transferring the image information to the window executing means, when a display on the at least one window of the first display means is indicated.

* * * * *

UNITED STATES PATENT AND TRADEMARK OFFICE
CERTIFICATE OF CORRECTION

PATENT NO. : 5,642,124

DATED : June 24, 1997

INVENTORS : TOMOAKI KAWAI ET AL.

It is certified that error appears in the above-identified patent and that said Letters Patent is hereby corrected as shown below:

COLUMN 1

Line 20, "on the" should be deleted; and
   Line 47, "same," should read --likewise--.

COLUMN 2

Line 13, "processor; and" should read --process or--; and
   Line 23, "map," should read --map--.

COLUMN 4

Line 44, "step 5-20.20." should read --step 5-20.--.

COLUMN 5

Line 4, "window" (2nd occurrence) should read --windows--.

Signed and Sealed this

Twenty-seventh Day of January, 1998

Attest:

BRUCE LEHMAN

Attesting Officer     Commissioner of Patents and Trademarks